United States Patent
Davis, Jr. et al.

[15] 3,657,864
[45] Apr. 25, 1972

[54] SEPARATION SYSTEM FOR THE RESOLVING OF VOLATILE MIXTURES

[72] Inventors: Flourian R. Davis, Jr.; Ernest A. Dewey, both of Richmond, Va.

[73] Assignee: Texaco Inc., New York, N.Y.

[22] Filed: Apr. 3, 1970

[21] Appl. No.: 25,430

[52] U.S. Cl. ...........................................................55/386
[51] Int. Cl. .......................................................B01d 15/08
[58] Field of Search ................261/94; 210/198; 55/67, 197, 55/386

[56] References Cited

UNITED STATES PATENTS

| | | | |
|---|---|---|---|
| 3,407,574 | 10/1968 | Perkins et al. | 55/386 |
| 3,374,606 | 3/1968 | Baddour | 55/197 X |
| 3,310,932 | 3/1967 | Melpolder | 55/386 |

OTHER PUBLICATIONS

" Torvex Ceramic Honeycomb," Dupont, Sept. 1967, 261-94, 4 pages.

*Primary Examiner*—Jim De Cesare
*Attorney*—Thomas H. Whaley and Carl G. Ries

[57] ABSTRACT

A system for the separation of volatile mixtures includes a packed sorbent bed in a column and has improved fluid flow characteristics owing to the incorporation therein of a plurality of spaced columnar discs having multiwalled passageways across the face thereof which provide areas of reduced packing density acting as discrete sites for the collection and redistribution of fluids as they flow through the column. Such discs consist, for example, of short lengths of honeycomb material. Fluids having different partition coefficients are introduced through a splash plate device which covers the radial surface area of one extremity of the packed bed with feed material. Sealing means can also be provided between the discs and the walls of the column to prevent the fluids from channeling up the column walls. The system is useful in gas-liquid chromatography, as well as with various absorption, adsorption and catalytic beds.

4 Claims, 5 Drawing Figures

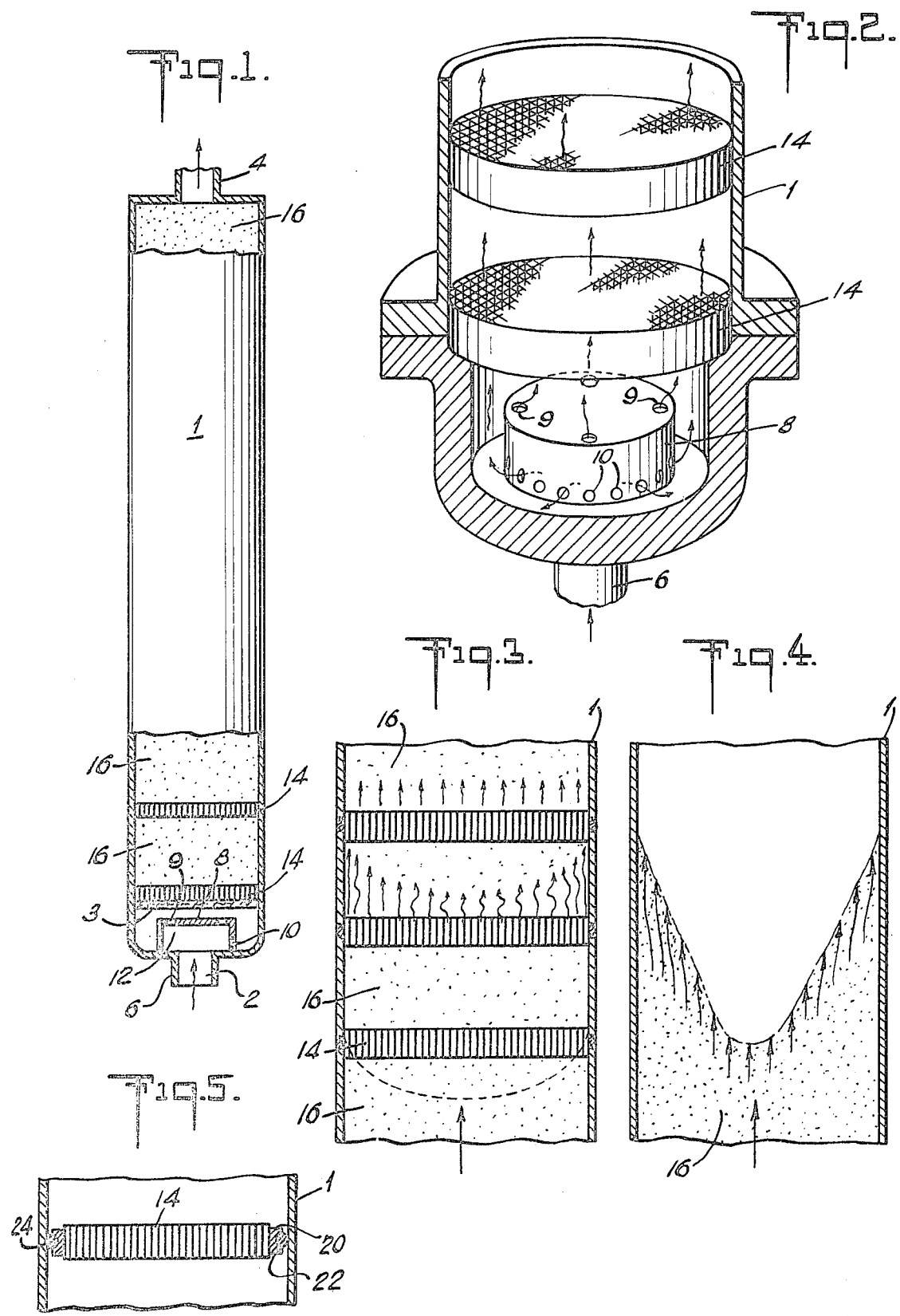

SEPARATION SYSTEM FOR THE RESOLVING OF VOLATILE MIXTURES

BACKGROUND OF THE INVENTION

This invention relates to novel means for uniformly distributing the flow of a fluid through a packed sorbent bed and more particularly to means for restricting the radial motion of the fluid and confining such motion to the axial direction.

More specifically, the invention relates to improved apparatus for the chromatographic separation improved apparatus for the chromatographic separation of fluids wherein means are provided for decreasing the radial diffusion of the fluids.

SUMMARY OF THE INVENTION

In accordance with the claimed invention, it has been discovered that the flow of a fluid through an absorbent packed column can be improved by incorporating in the column open, spaced, columnar discs which restrict the radial motion of the fluid and confine movement thereof to the axial direction by providing spaced multiwalled areas of reduced adsorbent packing density. These discs act as stream locators or collectors which redistribute the flow. This effect is particularly valuable in large scale equipment where channeling of the fluid stream decreases the separatory ability of columns having a large diameter. In one embodiment of the invention, discs having flow passages disposed in a honeycomb which have negligible pressure restriction and utilize maximum column cross section are positioned at a distance from one another ranging from one-half to one column diameter. The interface of the packing and the honeycomb are collecting sites for redistributing fluid flow to the packed bed.

The flow passages, which can vary in the geometry of their arrangement in the discs as well as in their size and shape, should be large enough to accommodate therein the sorbent material in a non-compacted state. The number of discs and their spacing may be varied as required by such factors as the similarity between or difference in the materials to be separated and other operating conditions.

In another embodiment of the invention novel fluid entrance means are employed which cooperate admirably with the columnar elements to enhance the separators ability of a relatively large diameter packed column.

BRIEF DESCRIPTION OF THE DRAWINGS

FIG. 1 is a schematic, partly cross-sectional view of a chromatographic column incorporating the invention.

FIG. 2 is a top plan view of one type of partition element according to the invention.

FIG. 3 is a fragmentary schematic view of the fluid flow through three discs according to the invention.

FIG. 4 is the same as FIG. 3 for a column of the same size without the discs.

FIG. 5 is a cross-sectional view of a chromatographic column provided with a ring type seal.

DETAILED DESCRIPTION OF THE INVENTION

For the sake of convenience, the invention will be described mainly with respect to chromatography, but it will be understood that the features of the invention which are described herein can be employed in any packed bed regardless of the type of sorbent material used in the apparatus.

As shown in FIG. 1, a chromatographic column embodying the features of the invention is referenced 1 and is generally of conventional design. The column 1 has an inlet 2 and an outlet 4. The conduit 6 conveys to inlet 2 a fluid mixture containing components to be separated, which components are entrained in a carrier fluid. Associated with the inlet and the outlet are flow metering devices, pumps and valves, all of which being of conventional design, which serve to introduce and withdraw the input and output. Detecting means are also associated with outlet 4 for detecting the separated constituents of the fluid mixture. Since the aforesaid means form no part of the present invention, they are not shown in the drawing.

Both the carrier fluid and the mixture of fluids to be separated pass through a splash plate injector 8, of novel design, which has a plurality of axial openings 9 at its top and radial flow passages 10 on its outer periphery communicating with central opening 12 therein. In the design of the apparatus of the invention, the diameter of the injector 8 will be such as to leave a space between its circumference and the walls of the column such that the fluids can be sprayed against the upwardly curved inner walls of the column's entrance.

This feature of the column is not critical and it will be appreciated that the column could terminate with a straight end as in conventional columns. However, the arrangement shown in FIG. 1 is conducive to the obtaining of column plug flow with the injector system of the invention insofar as effectiveness in uniformly spreading the feed stock over the novel columnar partition discs 14 of the invention. The first of these discs is shown positioned just above injector 8 and the space between these tow elements serves to equalize the pressure on the fluid moving through the column. No sorbent material is provided between injector 8 and the bottom of the neighboring disc. To prevent the sorbent material from entering this space through the openings of the disc, a fiberglass disc 3 is positioned immediately below the disc.

In the embodiment of the invention under consideration, the partition discs 14 have a honeycomb geometry. In a practical embodiment of the system of the invention with a column having a 10-inch diameter, a plurality of these discs were used which had a thickness of 2 inches and which were spaced from 5 to 10 inches apart so as to provide alternating areas forming multiwalled compartments in which the sorbent material 16 was loosely packed.

The columnar partition elements may have from three to eight walls. The actual geometry of these elements, their material of construction, as well as the spacing thereof will depend on various operating conditions such as the particle size and the sorbent material, the type of coating applied thereto to form the liquid phase of the system, if any such is used, the pressure drop applied to the system and the similarity or differences in the constituents of the fluid mixture to be separated in the system. Light metals including aluminum, as well as various plastics are suitable.

In development work associated with this invention it has been observed that when packing a large diameter column with the partition discs, it is very difficult to get the packing material as dense near the wall of the column as it is near the center of the column. In turn, this leaves a path of least resistance for the fluids to come up close to the walls of the column thereby decreasing its efficiency. This can be avoided by welding the discs on their periphery to the walls of the column or otherwise forming a seal between the outer wall of the disc and the column wall. One practical way of forming such a seal is illustrated in FIG. 5. There a flat washer 20 surrounding the outer wall of disc 14 is provided with a slot 22 in which fits an "0" ring 24 such that the outer diameter of the washer forms a seal with the inner diameter of the column.

FIG. 3 illustrates the flow through successive discs of the invention. The behavior of the fluid mixture is indicated by the small arrows. As shown, there is considerable flow in the center of even the second disc and the collection and distribution effect of this disc appears in the uniformity of flow through the subsequent disc. This flow pattern is to be contrasted with that shown in FIG. 4 for a same size column without discs. In FIG. 4 the flow is along the wall with no flow in the center.

In one example there was used as partition elements commercial grade aluminum sold under the trademarked name Hexcel, material having a one-fourth inch cell size and 1 inch thick in a 41 inch high, 4 inch diameter column. The discs were spaced by 4 inches. The column was packed with a diatomaceous earth material known as Chromosorb A. A mixture of equal parts of decane and decene was passed through the column at a temperature ranging from 30° to 350° F; a pressure of 40–50 psig; and a helium carrier velocity of 6.5 ft. per minute. The product purity was 75 percent. The same column packed with the same material when operated without any discs or with a combination of prior art disc and doughnut baffles gave no separation of this mixture under the same operating conditions.

It will be appreciated that the present system can be operated over wide temperature ranges limited only by the heat resistance of the materials used in the making thereof and by the heat resistance of the sorbent material and coating applied thereon.

What we claim is:

1. Separation system for the resolving of a fluid mixture comprising: a column containing a densely packed sorbent material, a plurality of spaced, columnar discs in said column; said discs having multiwalled axially directed passageways therein located transversely to the axis of said column, said passageways containing therein sorbent material in a reduced packing density state such that said passageways serve as discrete sites for the collection and redistribution of said mixture, thereby restricting radial motion of said fluid mixture and confining said motion in a substantially axial direction.

2. System according to claim 1 wherein said discs are of honeycomb geometry.

3. System according to claim 1, having a fluid inlet for said mixture, and a splash plate element having a plurality of radial flow passages communicating with said inlet and adapted for connection to a supply of said fluid mixture; said element being spaced inwardly of the walls of said column below the first of said discs.

4. System according to claim 3 wherein said column has upwardly curved walls in the lower part thereof.

* * * * *